E. J. GOULD AND W. PRESSLER.
AUXILIARY AUTOCAR DRIVE.
APPLICATION FILED MAY 22, 1919.
1,401,690.
Patented Dec. 27, 1921.
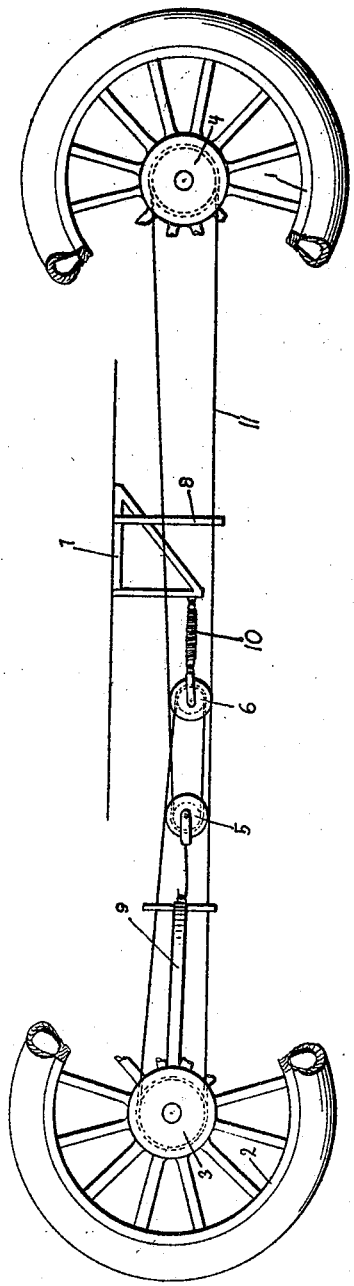
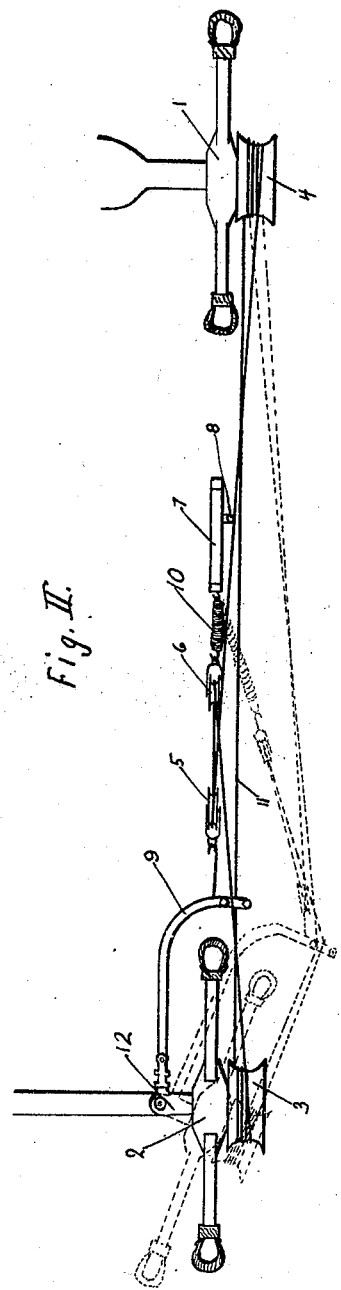
INVENTORS
Edwin J. Gould
Walter Pressler.

UNITED STATES PATENT OFFICE.

EDWIN J. GOULD AND WALTER PRESSLER, OF FRUITVALE, CALIFORNIA, ASSIGNORS TO MODERN MECHANICAL ENGINEERING COMPANY, OF ALAMEDA, CALIFORNIA, A CORPORATION OF CALIFORNIA.

AUXILIARY AUTOCAR-DRIVE.

1,401,690. Specification of Letters Patent. Patented Dec. 27, 1921.

Application filed May 22, 1919. Serial No. 299,028.

*To all whom it may concern:*

Be it known that we, EDWIN J. GOULD and WALTER PRESSLER, a citizen of the United States, and a citizen of Germany, respectively, residing at Fruitvale, county of Alameda, State of California, have invented certain new and useful Improvements in Auxiliary Autocar-Drives, whereof the following is a specification.

This invention relates to certain new and useful improvements in auxiliary drives for self propelled vehicles, and is of special benefit in mud, sand, or on ice, as it enables the vehicles to get the benefit of the traction, and also the brake resistance of all four of its wheels, it is moreover, very cheap and simple in its construction, and adapted to be quickly applied to a vehicle, and is readily taken off when not required.

This device is extremely simple, and yet has been found very reliable in operation, and durable in construction.

Its construction and application consist of a pulley, or belt wheel, fastened to both the rear and front wheels of a motor vehicle around which pulleys pass a driving belt for the purpose of applying the power from the rear wheel which is the driving wheel to the front wheel which thus becomes a driving wheel.

Other objects and advantages of the invention will hereinafter appear, and the novel features thereof will be particularly pointed out in the appended claims.

The invention is clearly illustrated in the accompanying drawings, which, with numerals marked thereon, form part of the specifications, and in which Figure 1, is a side view of the device in position for use, and Fig. 2 is top view of the same, showing a vertical section of the wheels.

Like numerals refer to like parts in the different views. 1 designates rear, or driving wheel, of a vehicle; 2 is the front wheel, and in this case the driven wheel; 3 is a pulley fastened to the front wheel; and 4 is a pulley fastened to the rear wheel; 5 and 6 are pulleys for the purpose of taking up the slack in the belt 11; 7 is a bracket attached to a vehicle for the purpose of fastening the spring 10 which controls pulley 6; 8 is a downwardly extending rod from the bracket 7 for the purpose of preventing the belt 11 from rubbing against the tire of wheel 1 when wheel 2 is swiveled in opposite direction to that shown in dotted lines, in steering the vehicle; 9 is an extension of the steering knuckle extending back of, and curved around the rear of wheel 2, and which carries two up and downwardly extending guide rods for keeping the belt 11 in line with the pulley 3 when wheel 2 is swiveled; 10 is a coil spring to allow slack in the belt in turning the vehicle, and to take up the same when the vehicle is running straight; 11 is a belt, and in this case it is a round belt, a rope or wire cable may be used; 12 is a steering knuckle.

In practice the belt passes one or more times around the pulley 4, and thence forward around the pulley 3 in the same manner, and from the top of the pulley 3 it then passes backward between the guards on the arm 9, to pulley 6, over this to pulley 5, and then back to the first named, pulley 4. It is preferably an endless round belt and where a rope or cable is used, it can be spliced together at the ends, the lower half of the belt also passes through, or between, the guides on the arm 9, which arm moves with the front wheel in turning, thus keeping the belt in line with pulley 3 on the front wheel, and at the same time not allowing the belt to come in contact with the front tire, while by the use of concave pulleys of extra width the deflection of the belt from a straight line with the pulley 4 is not sufficient to cause the belt 11 to run off of the pulley 4, the greatest point of deflection being near the front wheel and quite some distance from the rear pulley 4, the concavity of the driving and driven pulleys being considerable. When the belt is passed several times around each of the pulleys, the belt tends to run to one side, or on the largest part of each of them, something after the manner of a screw thread, and is prevented from running off from pulleys by the coils of the belt slipping toward the center, or smaller diameter of the pulleys, after a manner well known in the working of steam winches, etc., and as the belt is climbing toward the larger part of the pulleys at all times, when an extra strain is put on it, as in pressure from the steering wheel, the belt immediately slips toward the center of both pulleys and gives the necessary slack in the lower part of the belt for the increased distance between the pulleys caused by the action of the front wheel in steering, while the upper part of the belt moves the pulley 6 forward by extending spring 10, to allow for the steering action, and when the steering is in opposite direction, the spring 10 compresses and automatically takes up all the slack; in forward running the lower part of the belt carries nearly all of the strain of driving, and when several turns of the belt are used around the pulleys, a comparatively light spring can be used on pulley 6 to give the required tension to the belt.

When the invention is applied to both sides of a vehicle the resistance to steering is very slight, as the pull of the spring on one side offsets the pull of the opposite spring in all turning, although there would be an increased tendency of the vehicle to follow a straight course with its use which is an improvement in the way of safety.

While primarily intended for an auxiliary drive only, it can, by the use of very large pulleys on the wheels, be used to give more surface to support the vehicle on the lower part of the belt in very soft going where the tires sink in the ground. Also the two pulleys 5 and 6 can be dispensed with, and the device still be used in straight or slightly curved running; and the manner of applying tension to the belt admits of many variations beside that shown in the drawing; this would be true also of arm 9, as in straight running no belt guide would be needed.

We therefore do not intend to restrict ourselves to any particular construction of parts, etc., as herein disclosed, but reserve the right to make such changes, variations and modifications as come properly within the scope of the protection prayed.

What is claimed as new is:—

1. An auxiliary autocar drive, consisting of two concave pulleys attached to the rear and the front wheels of a vehicle, a belt passed several times around said pulleys to give greater adhesion, and the belt running from one pulley to the other and tightened by a tension pulley substantially as set forth.

2. An auxiliary autocar drive, comprising a belt running around two concave pulleys on vehicle wheels, an arm attached to the steering knuckle carrying two guides for said belt, a fixed pulley attached to said arm, and a spring controlled pulley opposite the fixed pulley, the belt passing over both last named pulleys to receive tension.

3. An auxiliary autocar drive, consisting of an endless belt, a drive pulley on the rear wheel for said belt, a driven pulley, on the front wheel actuated by said belt, and a means of keeping said belt in approximate alinement, and a means for maintaining a steady tension on said belt by means of a spring controlled pulley of sufficient flexibility to allow for steering the front wheels of a vehicle.

4. An auxiliary autocar drive, having an endless round belt extending from the rear to the front wheels of the vehicle, and pulleys on the outside of each wheel for said belt, a spring tension for said belt, and means of fastening said spring tension control to the vehicle, means for keeping the belt in approximate alinement, and means of keeping the belt from coming in contact with the tires of both wheels.

In testimony that we claim the foregoing, we have hereunto set our hands in the presence of two witnesses, this 10 of May 1919.

EDWIN J. GOULD.
WALTER PRESSLER.

Witnesses:
L. J. MORGAN,
WILLIAM RETALLACK.